(12) United States Patent
Noda

(10) Patent No.: US 11,667,557 B2
(45) Date of Patent: Jun. 6, 2023

(54) APPARATUS AND METHOD FOR PRODUCING POROUS GLASS PREFORM

(71) Applicant: Shin-Etsu Chemical Co., Ltd., Tokyo (JP)

(72) Inventor: Naoto Noda, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 17/644,083

(22) Filed: Dec. 13, 2021

(65) Prior Publication Data

US 2022/0185719 A1 Jun. 16, 2022

(30) Foreign Application Priority Data

Dec. 14, 2020 (JP) .............................. JP2020-207133

(51) Int. Cl.
*C03B 37/014* (2006.01)
(52) U.S. Cl.
CPC ...... *C03B 37/0142* (2013.01); *C03B 2207/22* (2013.01); *C03B 2207/36* (2013.01); *C03B 2207/81* (2013.01)
(58) Field of Classification Search
None
See application file for complete search history.

(56) References Cited

U.S. PATENT DOCUMENTS

| | | |
|---|---|---|
| 4,314,837 A | 2/1982 | Blankenship |
| 5,043,002 A | 8/1991 | Dobbins |
| 5,703,191 A * | 12/1997 | Henderson ........ C03B 37/01413 556/460 |
| 6,351,972 B1 | 3/2002 | Ohtsuka |
| 8,516,855 B2 | 8/2013 | Fogliani |
| 10,167,543 B2 | 1/2019 | Oozeki |
| 10,245,554 B2 | 4/2019 | Srivastava |
| 10,377,659 B2 | 8/2019 | Terashima |

(Continued)

FOREIGN PATENT DOCUMENTS

| | | |
|---|---|---|
| CN | 101287683 A | 10/2008 |
| CN | 101292117 A | 10/2008 |

(Continued)

OTHER PUBLICATIONS

Bell, "Study of conceptual design for flow-mixing stage of low-range humidity standard generator", NPL Report CMAM 39, National Physical Laboratory, 1999, 28 pages. (Year: 1999).*

(Continued)

*Primary Examiner* — Lisa L Herring

(57) ABSTRACT

A method and an apparatus for producing a porous glass preform by using organosiloxane raw material is provided. The apparatus for producing the porous glass preform 12 according to the present embodiment is configured to mix organosiloxane in a liquid state being a raw material with a carrier gas in a vaporizer 6, heat this mixture to be vaporized, supply this vapor to a burner 13 as a gas raw material, and produce a porous glass preform by depositing a glass fine particle produced by combusting the gas raw material on a starting material, herein the apparatus for producing a porous glass preform includes a moisture removing apparatus 8 configured to remove moisture in the carrier gas and supply the vaporizer with the carrier gas.

13 Claims, 2 Drawing Sheets

(56) References Cited

U.S. PATENT DOCUMENTS

| | | |
|---|---|---|
| 10,501,361 B2 | 12/2019 | Inoue |
| 10,604,439 B2 | 3/2020 | Ishihara |
| 2004/0237595 A1 | 12/2004 | Fogliani |
| 2005/0155390 A1 | 7/2005 | Nagasu |
| 2007/0169516 A1 | 7/2007 | Guskov |
| 2010/0217445 A1* | 8/2010 | Moretto ............ B29B 9/16 700/282 |
| 2013/0133375 A1 | 5/2013 | Fabian |
| 2013/0133376 A1 | 5/2013 | Fabian |
| 2013/0205832 A1 | 8/2013 | Miyasaka |
| 2014/0349830 A1 | 11/2014 | Trommer |
| 2015/0033799 A1 | 2/2015 | Ishihara |
| 2016/0096765 A1 | 4/2016 | Sayce |
| 2016/0107923 A1* | 4/2016 | Badeke ............ C03B 37/01413 423/337 |
| 2017/0333841 A1* | 11/2017 | Srivastava ............ C01B 3/56 |
| 2019/0300419 A1 | 10/2019 | Noda |

FOREIGN PATENT DOCUMENTS

| | | | |
|---|---|---|---|
| CN | 102099307 A | 6/2011 | |
| CN | 103755135 A | 4/2014 | |
| CN | 103842303 A | 6/2014 | |
| CN | 104125933 A | 10/2014 | |
| CN | 105712620 A | 6/2016 | |
| CN | 106082633 A | 11/2016 | |
| CN | 106430943 A | 2/2017 | |
| JP | S5218716 A | 2/1977 | |
| JP | S57188424 A | 11/1982 | |
| JP | H0517107 A | 1/1993 | |
| JP | H09156947 A | 6/1997 | |
| JP | 2000159532 A | 6/2000 | |
| JP | 2000264648 A * | 9/2000 | ....... C03B 37/01413 |
| JP | 2002512169 A * | 4/2002 | ............ C03C 3/06 |
| JP | 2004035376 A | 2/2004 | |
| JP | 2013166144 A | 8/2013 | |
| JP | 2013177297 A | 9/2013 | |
| JP | 2015502316 A | 1/2015 | |
| JP | 2016074584 A * | 5/2016 | ............ C03B 19/14 |
| JP | 2016522149 A * | 7/2016 | ............ C03C 3/06 |
| JP | 6661318 B2 | 3/2020 | |
| KR | 1614339 B1 * | 4/2016 | ....... C03B 19/1415 |
| KR | 2058156 B1 * | 12/2019 | ......... B01D 53/0438 |
| WO | WO-9954259 A1 * | 10/1999 | ......... C03B 19/1415 |
| WO | 2007046468 A1 | 4/2007 | |
| WO | 2010070062 A1 | 6/2010 | |

OTHER PUBLICATIONS

Terrigeol et al., "Practical Considerations for the Design Of Adsorbent Beds—Molecular Sieve Lifetime Optimization." Gas Processors Association 23rd Annual Technical Conference, 2015, 10 pages. (Year: 2015).*

Cote, "The Fundamentals of De Point Measurement in Compressed Air Systems", https://www.airbestpractices.com/system-assessments/air-treatmentn2/fundamentals-dew-point-measurement-compressed-air-systems, per Wayback Machine Sep. 21, 2020, 10 pages. (Year: 2020).*

Horn et al., "Direct Measurement of structural forces between two surfaces in a nonpolar liquid", J. Chem. Phys. 75, p. 1400-1411 (1981). (Year: 1981).*

Anten Chemical, "Overview 4A Molecular Sieves", https://www.antenchem.com/en/products/4a_molecular_sieve_powder.html, per Wayback Machine available Aug. 29, 2016. (Year: 2016).*

Extended European Search Report for counterpart European Application No. 19166406.9, issued by the European Patent Office dated Aug. 16, 2019.

Opposition against counterpart Indian Application 201914012533, filed by Opponent, Sonal, on Jul. 14, 2020.

Extended European Search Report for counterpart European Application No. 21159623.4, issued by the European Patent Office dated Jun. 22, 2021.

Office Action issued for counterpart Indian Application No. 201914012533, issued by the India Intellectual Property Office dated Jul. 18, 2022.

Office Action issued for counterpart Japanese Application No. 2020-207133, issued by the Japan Patent Office dated Apr. 26, 2022 (drafted on Apr. 20, 2022).

Notice of First Office Action for Patent Application No. 201910213190.8, issued by The National Intellectual Property Administration of the People's Republic of China dated Apr. 15, 2022.

Notice of Second Office Action for Patent Application No. 201910213190.8, issued by The National Intellectual Property Administration of the People's Republic of China dated Sep. 7, 2022.

* cited by examiner

APPARATUS AND METHOD FOR PRODUCING POROUS GLASS PREFORM

The contents of the following Japanese patent application(s) are incorporated herein by reference:
NO. 2020-207133 filed in JP on Dec. 14, 2020

BACKGROUND

1. Technical Field

The present invention relates to a method and an apparatus for producing a porous glass preform using an organosiloxane raw material.

Conventionally, a method for producing a porous glass fine particle body (porous glass preform) in which soot is formed by depositing a glass fine particle on a starting material such as a glass rod has been known. The porous glass preform can be dehydrated and sintered so as to be a glass preform used for producing optical fibers or the like.

The glass preform for producing optical fibers can be obtained specifically from a core preform produced by the VAD method or the like, by externally depositing thereon a $SiO_2$ fine particle, which are produced by combusting a silicon compound raw material such as organosiloxane, by the OVD method or the like so that a porous glass preform is produced, and sintering this porous glass preform for transparent vitrification, for example.

2. Related Art

With respect to a method for producing the glass preform, Patent Document 1 describes a method for producing the glass preform by introducing and vaporizing a liquid silicone compound raw material in a vaporizer heated to a temperature from 150 to 250 degrees Celsius, combusting a vaporized raw material gas with a burner so that a $SiO_2$ fine particle is produced, and then depositing the $SiO_2$ fine particle. In addition, Patent Document 2 describes a method for producing the glass preform by causing a liquid raw material introduced into a vaporizer to contact with a carrier gas of a high temperature from 150 to 230 degrees Celsius and thereby vaporizing the liquid raw material, combusting a vaporized raw material gas with a burner so that a $SiO_2$ fine particle is produced, and depositing the $SiO_2$ fine particle. Patent Document 3 describes a method for producing a synthetic quarts glass having a polyalkylsiloxane compound containing a residual moisture concentration of at least 3 ppm as a raw material.

[Patent Document 1]: Japanese Patent Application Publication No. 2013-177297.
[Patent Document 2]: Japanese Translation Publication of a PCT Route Patent Application No. 2015-502316.
[Patent Document 3]: Japanese Patent No. 6661318.

If using organosiloxane in a liquid state, which is represented by octamethylcyclotetrasiloxane (OMCTS), as a raw material of a glass fine particle, there is a method in which this organosiloxane is vaporized and supplied to a reaction system. A method for vaporizing a raw material in a liquid state includes a method in which the raw material is introduced into a vaporizer, the raw material is then heated in the vaporizer and vaporized, for example. However, upon introducing and vaporizing the raw material in the vaporizer, a part of the raw material may be decomposed, polymerized, or the like, and thereby a gelatinous polymerized material may be deposited on an inner wall or a pipe of the vaporizer. If the gelatinous polymerized material is deposited on the inner wall or the pipe of the vaporizer, it causes a rise in pressure in the vaporizer, or in a worst case, the pipe will be clogged up. In order to clean the vaporizer to remove the gelatinous polymerized material, equipment needs to be stopped for a while, which will be inefficient in a production process. Also, the polymerized material depositing on the inner wall of the vaporizer may change a state of transferring heat on the inner wall of the vaporizer, and thereby a vaporization ability of the vaporizer may be reduced.

[GENERAL DISCLOSURE]

A purpose of the present invention is to provide a method and an apparatus for producing a porous glass preform in which, if using organosiloxane in a liquid state as a raw material of a glass fine particle, a gelatinous polymerized material to be produced upon vaporizing in a vaporizer can be reduced.

A first aspect of the present invention provides a method for producing a glass preform including mixing organosiloxane in a liquid state being a raw material with a carrier gas in a vaporizer, heating this mixture to be vaporized, supplying this vapor to a burner as a gas raw material, depositing a glass fine particle produced by combusting the gas raw material on a starting material and thereby producing a porous glass preform, and sintering the porous glass preform, herein a moisture concentration in the carrier gas to be introduced into the vaporizer is reduced to 3 volppm or less.

A second aspect of the present invention provides an apparatus for producing a porous glass preform configured to mix organosiloxane in a liquid state being a raw material with a carrier gas in a vaporizer, heat this mixture to be vaporized, supply this vapor to a burner as a gas raw material, and produce a porous glass preform by depositing a glass fine particle produced by combusting the gas raw material on a starting material, herein the apparatus for producing a porous glass preform includes an apparatus configured to remove moisture in the carrier gas and supply the vaporizer with the carrier gas.

According to the method and the apparatus for producing the porous glass preform in the present invention, if using the organosiloxane in the liquid state as the raw material of the glass fine particle, the polymerized material to be produced upon vaporizing in the vaporizer can be reduced.

DESCRIPTION OF EXEMPLARY EMBODIMENTS

Figure 1:
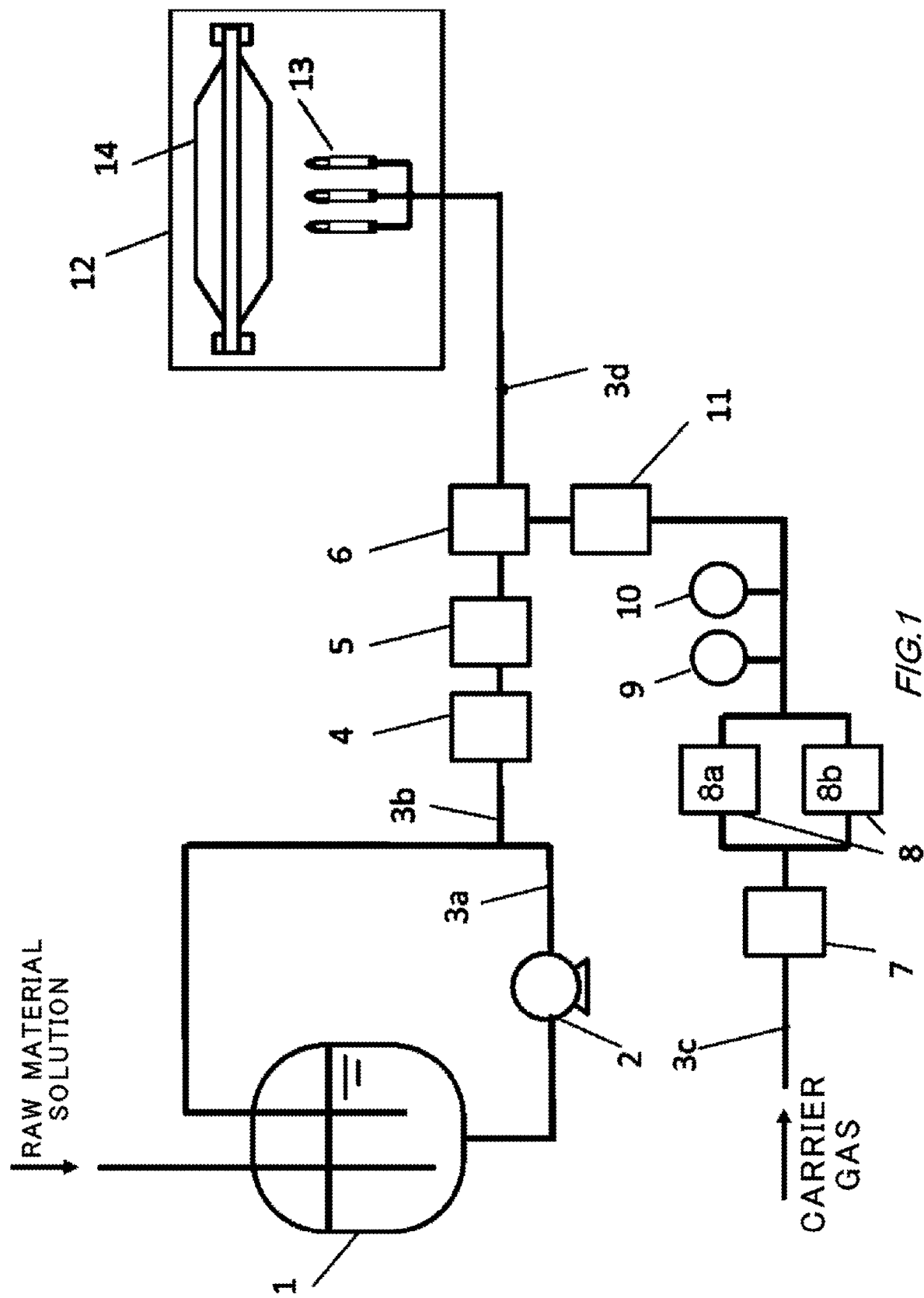
FIG. 1 illustrates one example of a raw material supplying system of an apparatus for producing a porous glass preform.

Hereinafter, embodiments of the present invention will be described. The same components are attached with the same reference numerals in each drawing, including the drawings used for describing the background.

FIG. 1 illustrates one example of a raw material supplying system of an apparatus for producing a porous glass preform 12 used for performing a method for producing the porous glass preform of the present invention.

Organosiloxane in a liquid state (also referred to as a "raw material solution") is injected from a raw material solution injecting pipe to a raw material solution tank 1 and stored therein, and then conducted toward a vaporizer 6. As a method for conducting the raw material solution from the raw material solution tank 1, a liquid conducting pump, gas pressure feeding, or the like can be adopted, for example. FIG. 1 illustrates a case in which a liquid conducting pump 2 is adopted. The raw material solution that has passed through the liquid conducting pump 2 is then conducted to a liquid conducting pipe. The liquid conducting pipe branches out to a circulation pipe 3*a* and a raw material solution supplying pipe 3*b* that leads to the vaporizer 6 along the way. The raw material solution supplying pipe 3*b* is provided with a liquid mass flow controller 5 for accurately controlling a mass flow rate of the raw material solution along the way. Note that, the liquid conducting pipe is preferably heated to an extent not to solidify the raw material solution to be conducted. The raw material solution having a mass flow rate controlled by the liquid mass flow controller 5 is then supplied to the vaporizer 6. The vaporizer 6 is supplied with the raw material solution supplied through the raw material solution supplying pipe 3*b*, as well as a carrier gas that has passed through a carrier gas supplying pipe 3*c*. The carrier gas supplying pipe 3*c* is provided with a gas mass flow controller 7 along the way. A raw material mixed gas generated by mixing and heating the raw material solution and the carrier gas in the vaporizer 6 is supplied to a burner 13 in the apparatus for producing the porous glass preform 12 through the raw material mixed gas pipe 3*d*.

Figure 2:
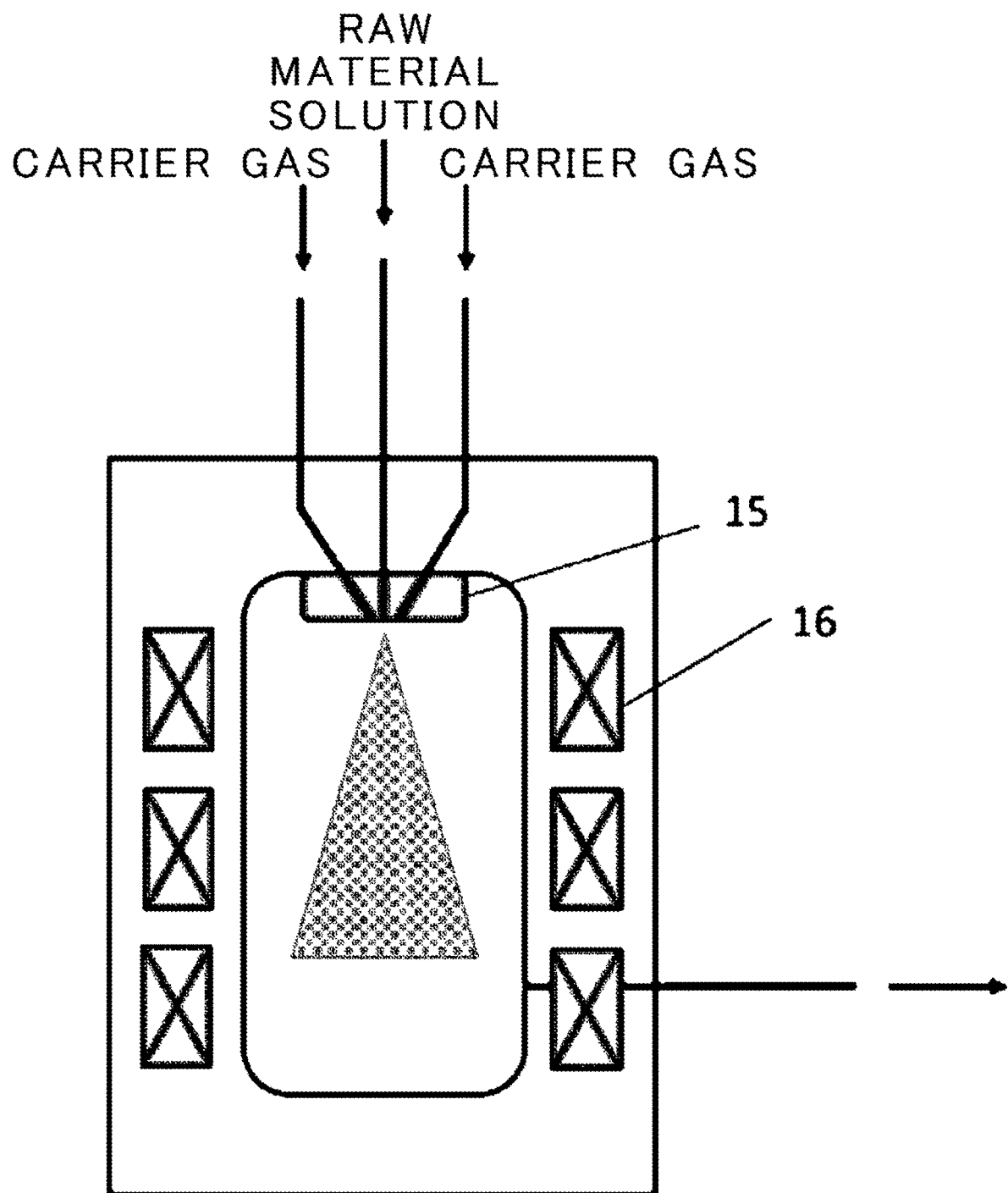
FIG. 2 illustrates one example of a configuration of a vaporizer used for performing method for producing a porous glass preform of the present invention.

FIG. 2 illustrates one example of a configuration of the vaporizer 6 used for performing the method for producing the porous glass preform of the present invention.

The vaporizer 6 includes an atomizer 15 for jetting out the raw material solution and the carrier gas into the vaporizer 6, and a heater 16 for heating an inner wall.

The atomizer 15 jets out the raw material solution from the middle, as well as the carrier gas from around the middle. The raw material solution is crushed by a flow of the carrier gas and turns into fine droplets, and then sprayed from the atomizer 15 being a starting point in a conical shape having a predetermined spraying angle. The sprayed droplets of the raw material solution are heated and vaporized in the vaporizer 6. The heating is performed by heat conducted from a preheated carrier gas that surrounds a droplet of the raw material solution, radiant heat from the inner wall of the vaporizer 6, and heat conducted from the inner wall to the droplet adhering to the inner wall.

If the droplets of the raw material solution adhering to the inner wall of the vaporizer 6 are excessively heated, a decomposing and polymerizing reaction that derives from the raw material progresses, and thereby a polymerized material is easily deposited on the inner wall or the like. If using octamethylcyclotetrasiloxane (OMCTS) having a boiling point of 175 degrees Celsius as the organosiloxane raw material, from the viewpoint of efficiently vaporizing the raw material solution, it is preferable to control a temperature of the inner wall of the vaporizer 6 to be from 150 to 230 degrees Celsius, or more preferably from 180 to 210 degrees Celsius if possible.

As shown in FIG. 1, the raw material solution is supplied to the vaporizer 6 by the liquid mass flow controller 5. The liquid mass flow controller 5 changes a supply mass flow rate of the raw material solution within a range from 0 g/minute to 100 g/minute, for example, depending on a deposition state at a time of producing the porous glass preform.

If using OMCTS as the organosiloxane raw material, its purity is desirably 99% by mass or more, preferably 99.5% by mass or more, and more preferably 99.9% by mass or more. OMCTS is likely to contain, as impurity components, hexamethylcyclotrisiloxane (HMCTS) being a cyclic siloxane trimer, or decamethylcyclopentasiloxane (DMCPS) being a cyclic siloxane pemtamer. These impurity components have reactivity and a boiling point different from those of the OMCTS. By increasing the purity of OMCTS, a polymerized product is prevented from being generated from a reaction of HMCTS having high reactivity progressing, and also there is no need to excessively increase a heating temperature of a pipe for the raw material gas, for accommodating DMCPS having a high boiling point.

The carrier gas has a mass flow rate adjusted by the gas mass flow controller 7 and also is preheated by the preheater 11, followed by being supplied to the vaporizer 6. A preheating temperature is preferably from 200 to 300 degrees Celsius. Depending on the deposition state at the time of producing the porous glass preform, the gas mass flow controller 7 supplies while changing a supply mass flow rate from 15 liter/minute (where 0 degrees Celsius, 1 atmospheric pressure conversion value) to 40 liter/minute (where 0 degrees Celsius, 1 atmospheric pressure conversion value), for example. If the carrier gas is increased, a droplet diameter of the raw material solution to be sprayed from the atomizer 15 becomes small, and thereby vaporization of the droplets progresses easily.

In order to facilitate the vaporization of the raw material, the carrier gas may be preheated in the preheater 11 and supplied to the vaporizer 6. The preheating temperature is preferably from 200 to 300 degrees Celsius.

A moisture concentration contained in the carrier gas to be introduced into the vaporizer is preferably reduced to 3 volppm or less. The moisture concentration is more preferably reduced to 1 volppm or less, or even more preferably reduced to 0.1 volppm or less.

Moisture causes a ring-opening reaction to occur easily in a molecule of OMCTS, and thereby linear siloxane containing terminal hydroxyl group is formed by the reaction with the moisture. The linear siloxanes containing a terminal hydroxyl group forms a high molecular weight polymer when a dehydration reaction occurs. Therefore, in order to reduce the polymerized product, it is important to manage the moisture concentration in the carrier gas with which the raw material solution contacts and gets mixed, and which is heated in the vaporizer 6.

As shown in FIG. 1, in the carrier gas supplying pipe 3*c*, a dew-point hygrometer 10 for measuring the dew point of the carrier gas, and an moisture removing apparatus 8 for reducing the moisture concentration in the carrier gas may be provided.

In order to remove moisture in an inert gas such as nitrogen, argon, and helium, or a gas such as oxygen, a dryer or the like is commonly used. By providing an additional moisture removing apparatus 8 in the carrier gas supplying pipe 3*c* for supplying to the vaporizer 6, the moisture concentration can further be reduced. For example, by using a piofine-cartridge made by Japan Pionics Co. Ltd. the moisture concentration in the gas at an outlet can be reduced to 1 ppb or less. Also, by providing a pressure gauge 9 and the dew-point hygrometer 10 on a downstream side of the moisture removing apparatus 8 in the carrier gas supplying pipe 3*c*, the moisture concentration in the carrier gas can be checked by the dew point and a pressure. For a conversion from the dew point to a water vapor pressure, those listed in the appended table lists 1.1 to 1.3 are used, which are obtained based on an equation of SON-NTAG shown in Japanese Industrial Standards JIS Z8806:2001, and thereby a volume moisture concentration is calculated from a ratio with a pressure at a measuring point of the dew-point hygrometer. For example, when a gauge pressure is 0.4 MPaG, a moisture concentration is 7.85 volppm if the dew point temperature is −50 degrees Celsius, 2.16 volppm if −60 degrees Celsius, 0.52 volppm if −70 degrees Celsius, 0.11 ppm if −80 degrees Celsius, and 0.02 ppm if −90 degrees Celsius.

A plurality of moisture removing apparatuses 8 may be equipped in parallel, as shown in FIG. 1. For example, between two pipelines 8a and 8b in parallel, only one of them (8a) is used while the other (8b) is closed with a valve, and if the pipeline in use (8a) experiences reduction in its refining ability which is detected by a rise in the dew point measured by the dew-point hygrometer 10, valves are opened and closed so as to switch the pipeline to use to the other one (8b). If the pipeline (8a) of which refining ability is reduced goes through recovery operation in the meantime, moisture can be continuously removed without stopping a production process.

In addition, a plurality of pipelines having a mass flow rate range different from each other may be equipped in parallel so as to be used by switching between them depending on a mass flow rate of the carrier gas, or a plurality of pipeline having approximately the same mass flow rate range may be equipped in parallel so that a number of the pipelines to use at the same time may be increased or decreased depending on a mass flow rate of the carrier gas. In this manner, the mass flow rate of the carrier gas can be widely changed depending on a production stage.

For the carrier gas, an inert gas such as nitrogen, argon, or helium, or oxygen, or a mixed gas of oxygen and the inert gas may be used. By using the inert gas such as nitrogen, argon, or helium as the carrier gas, the raw material can be safely transferred. On the other hand, it is not preferable to increase a proportion of the inert gas being irrelevant to the reactions too much. Oxygen or the mixed gas of oxygen and the inert gas facilitates, if being used as the carrier gas, complete combustion by being premixed with the raw material in the vaporizer 6. Note that, it is preferable that an amount of oxygen to be supplied is enough not to cause a flashback.

The moisture concentration in the organosiloxane raw material solution is more preferably reduced to 20 wtppm or less. As shown in FIG. 1, a moisture removing apparatus 4 for further reducing a moisture concentration of the organosiloxane raw material may be provided in the raw material solution supplying pipe 3b. As the apparatus configured to remove moisture in the solution, activated carbon, silica gel, zeolite, or the like can be used. For example, by using a molecular sieve made by Tomoe Engineering Co. Ltd. the moisture concentration in the raw material solution can be reduce to a few wtppm.

The raw material mixed gas in which the vaporized raw material gas and the carrier gas are mixed in the vaporizer 6 is supplied to the burner 13 through a raw material mixed gas pipe 3d. In order to prevent a raw material gas component to be reliquefied, the raw material mixed gas pipe 3d is preferably heated to a liquefaction temperature or higher, which is calculated from a partial pressure of the raw material mixed gas. Specifically, if the raw material is OMCTS, the liquefaction temperature is 175 degrees Celsius when the partial pressure is 1 atm, and 134 degrees Celsius when 0.3 atm. For example, an electric heater may be used for heating the raw material mixed gas pipe 3d.

If the raw material gas exhibits a poor combustion reaction in the burner 13, the incomplete combustion produces impurities such as a gel and a carbon particle, which adhere to the burner 13 and further disturb the combustion reaction, or get mixed with the porous glass preform. Upon sintering, the impurities mixed with the porous glass preform turn into bubbles that cause a defect on the porous glass preform. Therefore, by using oxygen as the carrier gas and premixing this oxygen and the raw material before supplying to the burner 13, reactivity of the raw material can be increased. As above, oxygen may be used as the carrier gas and mixed with the raw material in the vaporizer 6, or the inert gas such as nitrogen may be used as the carrier gas and oxygen may be mixed with the raw material mixed gas on the downstream side of the vaporizer 6. If mixing oxygen and the raw material mixed gas on the downstream side of the vaporizer 6, in order to prevent the raw material gas component to be reliquefied, oxygen may be preheated and then mixed with the raw material mixed gas.

As the burner 13, a multi-nozzle burner in which a plurality of nozzles is arranged, or a multi-tube burner in which multiple nozzles are disposed coaxially with each other, or the like may be used. A gas to be supplied to the burner 13 includes, apart from the premixed raw material mixed gas, a seal gas, a combustible gas for combustion, oxygen gas for combustion, and the like. As the combustible gas for combustion, hydrogen, methane, ethane, propane, or the like may be used, for example.

EXAMPLES

<Example 1>

The vaporizer 6 illustrates in FIG. 2 was used for producing a porous glass preform 14. Specifically, the vaporizer 6 was in a cylindrical shape of which inner wall had a diameter of 40 mm and height was 120 mm, and one bottom surface of the cylinder was provided with the atomizer 15 so that droplets were jetted out in a direction toward the other bottom surface. The vaporizer 6 was controlled so that the inner wall had a temperature of 185 degrees Celsius.

Next, OMCTS being the organosiloxane raw material was supplied to the vaporizer 6 at a mass flow rate of 65 g/minute. Here, a weight fraction of a moisture concentration in OMCTS was 15 wtppm (weight ppm) (measured by Karl Fischer coulometric titration).

Nitrogen in the carrier gas had a mass flow rate controlled to be 30 liter/minute (0 degrees Celsius, 1 atmospheric pressure conversion value) by the gas mass flow controller while being supplied to the vaporizer 6. The carrier gas had the dew point maintained at −69 to −68 degrees Celsius (where measurement precision being ±2 degrees Celsius) at the dew-point hygrometer 10 right before the vaporizer, and was preheated to 250 degrees Celsius by the preheater 11 and supplied to the vaporizer 6. Note that, the dew-point hygrometer used was a Hygrotec (registered trademark) made by General Eastern Instruments. Here, the pressure gauge 9 measured a gauge pressure of 0.4 MPaG. The moisture concentration in the carrier gas calculated from the pressure and the dew point is, taking a measurement error into consideration, 0.44 to 0.92 volppm (volume ppm). Then, the raw material mixed gas generated in the vaporizer 6 was supplied to the burner 13 in which a $SiO_2$ fine particle was then produced, the $SiO_2$ fine particle was deposited on the starting material to as to form the porous glass preform 14, then the porous glass preform 14 was sintered and thereby the transparent glass preform was produced.

After producing 85 kg of the porous glass preform, the vaporizer 6 was disassembled, and a weight of a gel adhering to the inner surface of the vaporizer 6 was measured as 1.3 g.

<Example 2>

Similar to Example 1, the porous glass preform 14 was produced by the vaporizer 6 illustrated in FIG. 2. The vaporizer 6 had a temperature controlled so as to be 185 degrees Celsius.

Next, OMCTS being the organosiloxane raw material was supplied to the vaporizer 6 at a mass flow rate of 65 g/minute. Here, a weight fraction of the moisture concentration in OMCTS was 15 wtppm (measured by Karl Fischer coulometric titration). Air in the carrier gas had a mass flow rate controlled to be 30 liter/minute (0 degrees Celsius, 1 atmospheric pressure conversion value) by the gas mass flow controller while being supplied to the vaporizer 6. Here, the air in the carrier gas which came out of the mass flow controller contained moisture so that the moisture was removed by the apparatus configured to remove moisture (the piofine-cartridge made by Japan Pionics Co. Ltd. and the dew point of the air was maintained at −69 to −68 degrees Celsius (where measurement precision being ±2 degrees Celsius) at the dew-point hygrometer 10 right before the vaporizer, then the air was preheated to 250 degrees Celsius in the preheater 11 and supplied to the vaporizer 6. Here, the pressure gauge 9 measured a gauge pressure of 0.4 MPaG. The moisture concentration in the carrier gas calculated from the pressure and the dew point is, taking a measurement error into consideration, 0.44 to 0.92 volppm. Then, the raw material mixed gas generated in the vaporizer 6 was supplied to the burner 13 in which a $SiO_2$ fine particle was then produced, the $SiO_2$ fine particle was deposited on the starting material to as to form the porous glass preform 14, then the porous glass preform 14 was sintered and thereby the transparent glass preform was produced.

After producing 85 kg of the porous glass preform, the vaporizer 6 was disassembled, and a weight of a gel adhering to the inner surface of the vaporizer 6 was measured as 1.1 g.

<Example 3>

Similar to Example 1, the porous glass preform 14 was produced by the vaporizer 6 illustrated in FIG. 2. The vaporizer 6 had a temperature controlled so as to be 185 degrees Celsius.

Next, OMCTS being the organosiloxane raw material was supplied to the vaporizer 6 at a mass flow rate of 50 g/minute. Here, a weight fraction of the moisture concentration in OMCTS was 15 wtppm (measured by Karl Fischer coulometric titration). Nitrogen in the carrier gas had a mass flow rate controlled to be 30 liter/minute (0 degrees Celsius, 1 atmospheric pressure conversion value) by the gas mass flow controller while being supplied to the vaporizer 6. Here, the nitrogen in the carrier gas which came out of the mass flow controller contained moisture and the moisture was removed by the apparatus configured to remove moisture (the piofine-cartridge made by Japan Pionics Co. Ltd. and the dew point of the nitrogen was maintained at −88 to −87 degrees Celsius (where measurement precision being ±2 degrees Celsius) at the dew-point hygrometer 10 right before the vaporizer, then the nitrogen was preheated to 250 degrees Celsius in the preheater 11 and supplied to the vaporizer 6. Here, the pressure gauge 9 measured a gauge pressure of 0.4 MPaG. The moisture concentration in the carrier gas calculated from the pressure and the dew point is, taking a measurement error into consideration, 0.02 to 0.05 volppm. Then, the raw material mixed gas generated in the vaporizer 6 was supplied to the burner 13 in which a $SiO_2$ fine particle was then produced, the $SiO_2$ fine particle was deposited on the starting material to as to form the porous glass preform 14, then the porous glass preform 14 was sintered and thereby the transparent glass preform was produced.

After producing 85 kg of the porous glass preform, the vaporizer 6 was disassembled, and a weight of a gel adhering to the inner surface of the vaporizer 6 was measured as 0.4 g.

<Example 4>

Similar to Example 1, the porous glass preform 14 was produced by the vaporizer 6 illustrated in FIG. 2. The vaporizer 6 had a temperature controlled so as to be 185 degrees Celsius.

Next, OMCTS being the organosiloxane raw material was supplied to the vaporizer 6 at a mass flow rate of 50 g/minute. Here, a weight fraction of the moisture concentration in OMCTS was 5 wtppm (measured by Karl Fischer coulometric titration). Nitrogen in the carrier gas had a mass flow rate controlled to be 30 liter/minute (0 degrees Celsius, 1 atmospheric pressure conversion value) by the gas mass flow controller while being supplied to the vaporizer 6. Here, the nitrogen in the carrier gas which came out of the mass flow controller contained moisture and the moisture was removed by the apparatus configured to remove moisture (the piofine-cartridge made by Japan Pionics Co. Ltd. and the dew point of the nitrogen was maintained at −88 to −87 degrees Celsius (where measurement precision being ±2 degrees Celsius) at the dew-point hygrometer 10 right before the vaporizer, then the nitrogen was preheated to 250 degrees Celsius in the preheater 11 and supplied to the vaporizer 6. Here, the pressure gauge 9 measured a gauge pressure of 0.4 MPaG. The moisture concentration in the carrier gas calculated from the pressure and the dew point is, taking a measurement error into consideration, 0.02 to 0.05 volppm. Then, the raw material mixed gas generated in the vaporizer 6 was supplied to the burner 13 in which a $SiO_2$ fine particle was then produced, the $SiO_2$ fine particle was deposited on the starting material to as to form the porous glass preform 14, then the porous glass preform 14 was sintered and thereby the transparent glass preform was produced.

After producing 85 kg of the porous glass preform, the vaporizer 6 was disassembled, and a weight of a gel adhering to the inner surface of the vaporizer 6 was measured as 0.2 g.

<Comparative Example 1>

Similar to Example 1, the porous glass preform 13 was produced by the vaporizer 6 illustrated in FIG. 2. The vaporizer 6 had a temperature controlled so as to be 185 degrees Celsius.

Next, OMCTS being the organosiloxane raw material was supplied to the vaporizer 6 at a mass flow rate of 65 g/minute. Here, a weight fraction of the moisture concentration in OMCTS was 15 wtppm (measured by Karl Fischer coulometric titration). Nitrogen in the carrier gas had a mass flow rate controlled to be 20 liter/minute (0 degrees Celsius, 1 atmospheric pressure conversion value) by the gas mass flow controller while being supplied to the vaporizer 6. The carrier gas had the dew point of −55 to −54 degrees Celsius (where measurement precision being ±2 degrees Celsius) at the dew-point hygrometer 10 right before the vaporizer, and was preheated to 250 degrees Celsius by the preheater 11 and supplied to the vaporizer 6. Here, a pressure gauge 9 measured a gauge pressure of 0.4 MPaG. The moisture concentration calculated from the pressure and the dew point is, taking a measurement error into consideration, 3.2 to 6.1 volppm. The raw material mixed gas generated in the vaporizer 6 was supplied to the burner 13 in which a $SiO_2$ fine particle was then produced, the SiO$_2$ fine particle was deposited on the starting material to as to form the porous glass preform 14, then the porous glass preform 14 was sintered and thereby the transparent glass preform was produced.

After producing 62 kg of the porous glass preform, the vaporizer 6 was disassembled, and a weight of a gel adhering to the inner surface of the vaporizer 6 was measured as 7.4 g.

Table 1 shows the amount of the gel that was adhering to the inner surface of the vaporizer 6 in Example 1 to 4, and Comparative Example 1, together with various conditions thereof. As illustrated, by reducing the moisture concentration in the carrier gas to be introduced into the vaporizer 6 to 3 volppm or less, production of the polymerized material was reduced upon vaporizing in the vaporizer 6.

TABLE 1

| | EXAMPLE 1 | EXAMPLE 2 | EXAMPLE 3 | EXAMPLE 4 | COMPARATIVE EXAMPLE 1 |
|---|---|---|---|---|---|
| MOISTURE CONCENTRATION IN OMCTS (wtppm) | 15 | 15 | 15 | 5 | 15 |
| TYPE OF CARRIER GAS | NITROGEN | AIR | NITROGEN | NITROGEN | NITROGEN |
| MOISTURE CONCENTRATION IN CARRIER GAS (volppm) | 0.44~0.92 | 0.44~0.92 | 0.02~0.05 | 0.02~0.05 | 3.2~6.1 |
| MASS FLOW RATE OF OMCTS (g/min) | 65 | 65 | 50 | 50 | 65 |
| MASS FLOW RATE OF CARRIER GAS (SLM) | 30 | 30 | 30 | 30 | 20 |
| AMOUNT OF GEL ADHERING (g) | 1.3 | 1.1 | 0.4 | 0.2 | 7.4 |

Note that, the present invention is not limited to the above embodiments or examples. The technical scope of the present invention includes anything that has substantially the same configuration as the technical idea described in the claims of the present invention and produces the same effects, no matter how much it has been changed.

What is claimed is:

1. A method for producing a glass preform, comprising:
   reducing a moisture concentration in a carrier gas with a dryer;
   providing the carrier gas from a mass flow controller through two parallel carrier gas supplying pipelines, wherein each of the two parallel carrier gas supplying pipelines have a moisture-reducing apparatus;
   further reducing the moisture concentration in the carrier gas with the moisture-reducing apparatus in a selected one of the two parallel carrier gas supplying pipelines to 3 volppm or less;
   measuring a dew-point with a dew-point hygrometer on a downstream side of the two parallel carrier gas supplying pipelines;
   actuating at least one valve to switch use between one or the other of the two parallel carrier gas supplying pipelines based on an output of the dew-point hygrometer;
   mixing organosiloxane in a liquid state being a raw material with the carrier gas having reduced moisture concentration in a vaporizer;
   heating this mixture to be vaporized;
   supplying this vapor to a burner as a gas raw material;
   depositing a glass fine particle produced by combusting the gas raw material on a starting material and thereby producing a porous glass preform;
   and sintering the porous glass preform.

2. The method for producing the glass preform according to claim 1, wherein the moisture concentration in the carrier gas to be introduced into the vaporizer is reduced to 1 volppm or less.

3. The method for producing the glass preform according to claim 1, wherein the moisture concentration in the carrier gas to be introduced into the vaporizer is reduced to 0.1 volppm or less.

4. The method for producing the glass preform according to claim 1, wherein the heating is performed by the carrier gas that has been preheated.

5. The method for producing the glass preform according to claim 1, wherein the heating is performed by heat generated from an inner wall of the vaporizer that has been heated with a heater.

6. The method for producing the glass preform according to claim 1, wherein an inert gas including at least one of nitrogen, argon, and helium is used as the carrier gas.

7. The method for producing the glass preform according to claim 1, wherein oxygen or a mixed gas of oxygen and an inert gas is used as the carrier gas.

8. The method for producing the glass preform according to claim 1, wherein the moisture concentration in the carrier gas is reduced by the moisture reducing apparatus by at least one of the following moisture-reducing components:
   dryer, and
   piofine-cartridge.

9. The method for producing the glass preform according to claim 1, wherein the carrier gas having a moisture concentration reduced by the moisture reducing apparatus is supplied to the vaporizer while measuring the dew point in the carrier gas.

10. The method for producing the glass preform according to claim 1, wherein the carrier gas is preheated to from 200 to 300 degrees Celsius and then supplied to the vaporizer.

11. The method for producing the glass preform according to claim 1, wherein the organosiloxane is octamethylcyclotetrasiloxane.

12. The method for producing the glass preform according to claim 1, wherein a moisture concentration in a raw material solution containing the organosiloxane is reduced to 20 wtppm or less.

13. The method for producing the glass preform according to claim 1, wherein a moisture concentration in a raw material solution containing the organosiloxane is reduced by at least one of the following moisture-reducing components:
- activated carbon,
- silica gel,
- zeolite, and
- molecular sieve.

* * * * *